(12) United States Patent
Gaugler

(10) Patent No.: US 10,355,250 B2
(45) Date of Patent: Jul. 16, 2019

(54) LITHIUM CELL

(71) Applicant: VARTA Microbattery GmbH, Ellwangen Jagst (DE)

(72) Inventor: Winfried Gaugler, Ellwangen (DE)

(73) Assignee: VARTA Microbattery GmbH (DE)

( * ) Notice: Subject to any disclaimer, the term of this patent is extended or adjusted under 35 U.S.C. 154(b) by 0 days.

(21) Appl. No.: 15/723,269

(22) Filed: Oct. 3, 2017

(65) Prior Publication Data

US 2018/0102511 A1  Apr. 12, 2018

(30) Foreign Application Priority Data

Oct. 10, 2016 (EP) .................................... 16193158

(51) Int. Cl.
| | |
|---|---|
| *H01M 2/02* | (2006.01) |
| *H01M 10/0525* | (2010.01) |
| *H01M 10/04* | (2006.01) |
| *H01M 10/058* | (2010.01) |
| *H01M 2/06* | (2006.01) |
| *H01M 6/16* | (2006.01) |

(52) U.S. Cl.
CPC .......... *H01M 2/0235* (2013.01); *H01M 2/06* (2013.01); *H01M 6/16* (2013.01); *H01M 10/0422* (2013.01); *H01M 10/058* (2013.01); *H01M 10/0525* (2013.01)

(58) Field of Classification Search
CPC ........ H01M 2/0235; H01M 2/06; H01M 6/16; H01M 10/0422; H01M 10/0525; H01M 10/058

USPC ........................................................... 429/94
See application file for complete search history.

(56) References Cited

U.S. PATENT DOCUMENTS

| | | | | |
|---|---|---|---|---|
| 3,945,846 A | * | 3/1976 | Dey ..................... | H01M 2/0235 429/166 |
| 4,565,002 A | * | 1/1986 | Matsuo ................. | B29C 53/382 29/623.4 |

FOREIGN PATENT DOCUMENTS

| | | |
|---|---|---|
| DE | 32 40 806 A1 | 5/1984 |
| JP | 2009-218519 A | 9/2009 |

OTHER PUBLICATIONS

European Search Report dated Feb. 23, 2017 in corresponding European Patent Application No. 16193158.9.

\* cited by examiner

*Primary Examiner* — Jayne L Mershon
(74) *Attorney, Agent, or Firm* — DLA Piper LLP (US)

(57) ABSTRACT

A lithium cell includes a housing including a housing cup, a cover plate and an annular insulating sealing element, wherein the housing has an end-side cup base, a circumferential housing casing and a circular opening opposite the housing base and formed by an opening edge. The cover plate has a circumferential edge and closes the circular opening. The cell includes a pin-shaped negative electrode current collector electrically connected to the cover plate. The sealing element is fitted onto the edge of the cover plate. The sealing element insulates the cover plate and the housing cup from one another. The cell can be produced by the components being brought together in two preassembled units combined to form the cell.

5 Claims, 1 Drawing Sheet

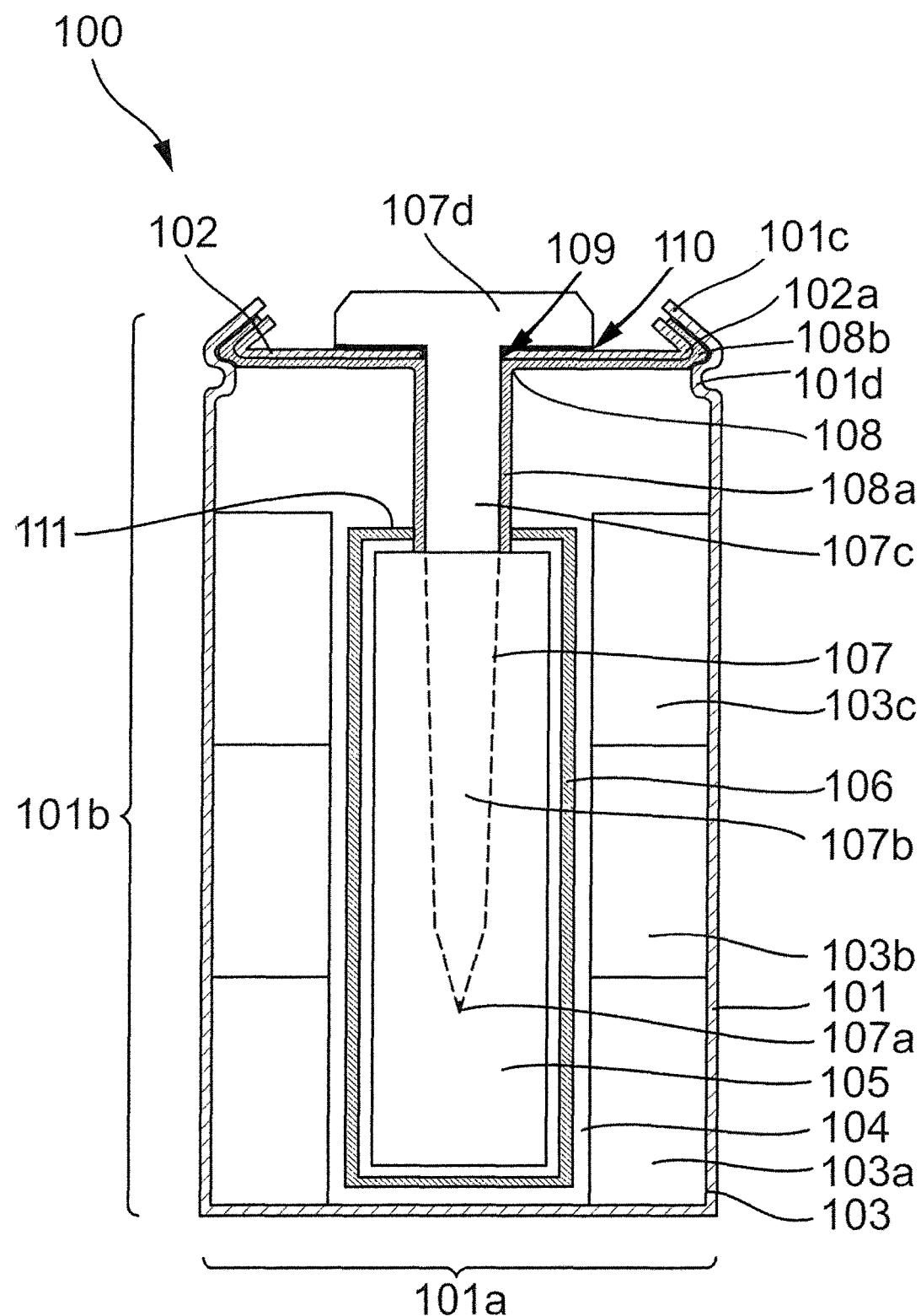

LITHIUM CELL

TECHNICAL FIELD

This disclosure relates to a cell having a positive electrode in the form of a hollow cylinder and defines a hollow space, and an electrode of opposite polarity arranged in the hollow space.

BACKGROUND

Cells designed with a hollow cylinder defining a hollow space are often cells in which an alkali metal, in particular lithium, is used as active material in the negative electrode. Examples of cells with a negative lithium electrode are the lithium thionyl chloride cell, lithium sulphur dioxide cell, lithium carbon monofluoride cell, lithium iron sulphide cell and lithium manganese dioxide cell. Manganese dioxide electrodes are used as positive electrodes in the last-mentioned lithium manganese dioxide cell, iron disulphide electrodes are used as positive electrodes in a lithium iron sulphide cell, and sulphur dioxide dissolved in acetonitrile (absorbed in an inert electrode) is used as positive electrodes in a lithium sulphur dioxide cell. The positive electrodes are in the form of hollow cylinders in many cases here. The negative lithium electrode is arranged in the interior of the positive electrode, sheathed by a separator separating the positive electrode from the negative electrode, but in the process, permits ion transport between the two electrodes. In that case, the ion transport is generally ensured by use of a suitable electrolyte. Electrolytes in which a salt such as lithium hexafluorophosphate, for example, is dissolved in an organic solvent, for example, in a carbonate are particularly suitable for cells with lithium electrodes.

Electrical contact with the positive electrode does not generally present a problem. The outside of the positive electrode is usually in direct contact with the inner wall of an electrically conductive housing part. Electrical contact can accordingly be made by the housing part. However, it is more difficult to make contact with the negative electrode. A pin-like current collector is conventionally used for this purpose, the pin-like current collector being conically tapered at one end and provided with a flange at the other end, the flange playing a role in sealing off the housing. A typical example of a current collector of this kind can be found in DE 3240806 A1. The FIGURE in that application illustrates a cell of which the housing is made up of two metal half-parts 2 and 3. One of the half-parts is a housing cup 2, the other a flat cover plate 3 with which the housing cup 2 is closed. The housing cup 2 bears directly against the positive electrode 4. Since the two half-parts 2 and 3 are welded to one another, they have the same (positive) polarity. Contact is made with the negative electrode 5 by the nail-like, two-part arrester 9. The arrester is guided to the outside through an aperture in the flat cover plate 3 and insulated from the flat cover plate 3 by two sealing elements 11 and 13.

It could therefore be helpful to provide a cell distinguished by a simple design and low production costs.

SUMMARY

I provide a lithium cell including a positive electrode in the form of a hollow cylinder and defining a hollow space, a negative electrode arranged in the hollow space, a separator arranged between the positive and negative electrodes, a liquid electrolyte with which the electrodes and the separator are impregnated, a housing surrounding an interior space in which the positive and the negative electrodes and the separator are arranged, wherein the housing includes a cylindrical housing cup, a cover plate and an electrically insulating, annular sealing element, the housing cup has an end-side cup base, a circumferential housing casing and an end-side, circular opening is situated opposite the housing base and is formed by a circular opening edge, and the cover plate is circular, has a circumferential edge and closes the circular opening, and a pin-shaped current collector for the negative electrode, wherein the sealing element is fitted onto the edge of the cover plate and insulates the cover plate and the housing cup from one another, and the pin-shaped current collector electrically connects to the cover plate.

I also provide a method of producing a lithium cell including providing a preassembled positive unit including a cylindrical housing cup with an end-side base, a circumferential housing casing and an end-side, circular opening situated opposite the housing base and is formed by a circular opening edge, and a positive electrode in the form of a hollow cylinder, define a hollow space and is arranged in the housing cup; providing a preassembled negative unit including a circular cover plate with a circumferential edge, a negative electrode, a separator surrounding the negative electrode, a pin-shaped current collector for the negative electrode, which current collector has a terminal section completely recessed in the negative electrode and which current collector electrically connects to the cover plate, and an annular, electrically insulating sealing element fitted onto the edge of the cover plate; filling the housing cup with a liquid electrolyte; inserting the preassembled negative unit into the positive unit so that the negative electrode is positioned in the hollow space defined by the positive electrode; and closing the cell by a flanging process.

BRIEF DESCRIPTION OF THE DRAWING

FIG. 1 is a schematic longitudinal section that explains a preferred example of my cells.

DETAILED DESCRIPTION

It will be appreciated that the following description is intended to refer to a specific example of structure selected for illustration in the drawing and is not intended to define or limit the disclosure, other than in the appended claims.

My cell is a lithium cell which, like the cells of the generic type described above, always has a positive electrode in the form of a hollow cylinder and defines a hollow space, and a negative electrode arranged in the hollow space. A separator is arranged between the positive and the negative electrode. Both the separator and the electrodes are impregnated with a liquid electrolyte. The positive electrode together with the negative electrode, arranged in the hollow space, and the separator are surrounded by a housing. The housing has an interior space in which the electrodes and the separator are arranged.

The housing comprises a housing cup, a cover plate and an electrically insulating, annular sealing element, wherein the housing cup is of cylindrical design and has an end-side cup base, a circumferential housing casing and an end-side, circular opening situated opposite the housing base and is formed by a circular opening edge. The cover plate is of circular design, has a circumferential edge and closes the circular opening.

In general, both the housing cup and the cover plate are composed of a metal, for example, sheet steel.

The cell comprises a pin-like current collector for the negative electrode, which current collector electrically connects to the cover plate. The sealing element is fitted onto the edge of the cover plate. The sealing element insulates the cover plate and the housing cup from one another. Since the pin-like current collector electrically conductively connects to the cover plate, it can serve, in combination with the cover plate, as a first current collector for the negative electrode.

It is preferred that the positive electrode of hollow-cylindrical design is in direct contact with the housing cup, in particular bears directly against the housing cup over a large surface area. The cup-like housing part preferably serves as a second current collector of the cell.

The construction has major advantages. Whereas five structural parts conventionally have to be combined with one another to close a housing cup and make contact with the negative electrode, only three structural parts (the cover plate, the electrically insulating sealing element and the pin-like current collector) are required for this purpose in a cell. In addition, the three structural parts can be processed as a preassembled unit. All of this simplifies assembly of the cell and reduces costs.

Since the current collector electrically conductively connects to the cover plate, the connection to the cover plate can also be realized by welding in particular. Preferably, the cell is distinguished by at least one of the following features:

1) The pin-like current collector is welded to the cover plate.
2) The cover plate has an aperture through which the pin-like current collector is guided.
3) The cover plate and the pin-like current collector connect to one another by an annular welding line guided around the pin-like current collector.

The aperture is not necessarily required since the pin-like current collector does not have to be guided out of the housing. Irrespective of this, it may be advantageous to guide the current collector through an aperture in the cover plate and connect the cover plate and the pin-like current collector to one another by the annular welding line around the pin-like current collector. The aperture can be hermetically sealed in this way so that it is possible to prevent electrolyte from escaping in this region.

Preferably, the housing casing of the cylindrical housing cup has a circumferential lug preferably formed by radial drawing-in and faces the interior space, preferably not far beneath the circular opening edge. The lug serves as a positioning means for the cover plate. The edge of the cover plate then sits, preferably together with the sealing element which is fitted on it, on the lug.

It is further preferred that the circular opening edge of the housing cup is bent radially inward over the edge of the cover plate so that the diameter of the opening which is defined by the opening edge is smaller than the diameter of the cover plate. A cover plate sitting on the lug is then pushed onto the lug by the radially inwardly bent opening edge and fixed.

The pin-like current collector has a first, terminal section completely recessed in the negative electrode, and a second section not in direct contact with the negative electrode.

The pin-like current collector is preferably composed of a metal, preferably steel, in particular a stainless steel. Preferably, the current collector can also have a preferably closed coating is composed of nickel or a nickel alloy.

Preferably, the pin-like current collector has two ends, one of which is in the form of a conically tapering tip and the other of which has a head. The pin-like current collector preferably has the conically tapering tip at the free end of the first terminal section. The second section is preferably located between the head and the first, terminal section.

The pin-like current collector can be provided with a thread on its outer side, in particular in the region of the first, terminal section. The region provided with the thread is, within the meaning of the above definition, preferably the first, terminal section of the pin-like current collector. Therefore, that region of the shank provided with the thread is particularly preferably completely recessed in the negative electrode. The second section of the pin is then preferably the region of the shank between the head and the first, terminal section.

It may be particularly preferred that the cell has an insulator element protecting the second section, at least in regions, from direct contact with the electrolyte.

One problem occurring time and again in lithium cells is the occurrence of internal short circuits. Lithium ions dissolved in the electrolyte can be deposited on the current collector for the negative electrode with dendrite formation. This dendrite formation is a problem in particular when temperature differences occur within a cell, for example, as a result of local heating by an external heat source or as a result of local cooling when a portion of the cell is in direct contact with a good thermal conductor. The dendrites grow over time and can come into direct contact with the positive electrode starting from a certain size, this causing the short circuits. The insulator element very effectively suppresses dendrite formation on the current collector for the negative electrode.

The insulator element is preferably composed of an electrically non-conductive material, in particular of an electrically non-conductive plastic, which is impermeable to the electrolyte contained in the cell. The insulator element is preferably composed of a pore-free plastic. Suitable plastics are, for example, polypropylene (PP), polyphenylene sulphide (PPS), polyamide (PA) and polyether ether ketone (PEEK). Multilayer films may also be used if desired, for example, films comprising two layers of PP and a layer of PA arranged therebetween.

The insulator element is particularly preferably a sleeve that can be manufactured by injection molding or thermoforming, for example, from a film composed of one of the plastic materials.

The insulator element ideally bears tightly against the surface of the pin-like current collector in the second section. To this end, the size and shape of the insulator element are preferably matched exactly to the shape and dimensions of the pin-like current collector used.

Particularly preferably, the cell comprises an integral plastic part fulfilling both the function of the insulator element and the electrically insulating sealing element. The plastic part therefore preferably comprises a sleeve-like section protecting the second section of the pin-like current collector, at least in regions, from direct contact with the electrolyte and, furthermore, an annular section fitted onto the edge of the cover plate and protecting the cover plate and the housing cup from one another. The sleeve-like section and the annular section preferably connect by a plate-like intermediate region.

Particularly preferably, the separator is a closed container completely surrounding the negative electrode and having only one aperture for the pin-like current collector. In this case, the separator can be fixedly connected to the insulator element, for example, by welding or adhesive bonding.

The separator is a porous sleeve composed of plastic, for example, polypropylene. The separator particularly preferably comprises one or more non-woven portions.

The lithium cell described can be manufactured in a particularly simple manner according to the method described below. In the method, a preassembled positive unit and a preassembled negative unit are assembled to form a lithium cell.

The positive unit comprises the following components:
1) a cylindrical housing cup with an end-side cup base, a circumferential housing casing and an end-side, circular opening situated opposite the housing base and formed by a circular opening edge, and
2) a positive electrode in the form of a hollow cylinder, defines a hollow space and is arranged in the housing cup.

For production-related reasons in particular, the positive electrode in the form of a hollow cylinder is generally not inserted into the housing cup in one piece, but rather in the form of individual segments forming the positive electrode when combined. It is accordingly preferred that the positive electrode comprises at least two annular individual segments adjoining one another in a planar fashion by first contact faces and bear against the first housing part by second contact faces. For example, two or more annular segments can be stacked one on top of the other in the housing cup. In this case, the inside diameter of the annular segments determines the volume and the diameter of the hollow space for the negative electrode. The outside diameter of the annular segments is generally matched exactly to the corresponding inside diameter of the housing cup.

The negative unit comprises the following components:
1) a circular cover plate with a circumferential edge,
2) a negative electrode,
3) a separator surrounding the negative electrode,
4) a pin-like current collector for the negative electrode, which current collector has a terminal section completely recessed in the negative electrode and which current collector electrically connects to the cover plate, and
5) a seal fitted onto the edge of the cover plate.

Preferred properties of the cited components of the positive and the negative unit have already been described in connection with the cell. Reference is hereby made to that description.

Particularly preferably, the pin-like current collector is already fixedly welded to the cover plate in the negative unit.

To assemble a lithium cell, the housing cup of the preassembled positive unit is filled with a suitable liquid electrolyte in a first step. In a next step, the preassembled negative unit is inserted into the positive unit so that the negative electrode is positioned in the hollow space defined by the positive electrode. The cell is then closed by a flanging process The described features, and further features, of the battery can be found in the following description of the preferred example illustrated in the drawing. In this context, individual features can be implemented on their own or in combination with one another. The described examples serve merely for the purpose of explanation and to provide better understanding and are not to be understood as restrictive in any way.

The cell 100 has a housing comprising a housing cup 101 and a cover plate 102. The housing cup 101 comprises a planar, circular base 101a and a cylindrical casing 101b. At the end side, the housing cup 101 has a circular opening situated opposite the base 101a and defined by the opening edge 101c. The opening is closed by the cover plate 102.

The positive electrode 103 in the form of a hollow cylinder and made up of three individual segments 103a to 103c is arranged in the interior of the housing. The positive electrode 103 is substantially composed of manganese dioxide. The individual segments 103a to 103c are each of annular design and have a respectively identical outside and inside diameter. The individual segments are arranged in a stack-like manner within the housing part 101 and in the centre define the hollow space 104. The negative electrode 105 composed of metallic lithium (a strand of lithium metal) and surrounded by a cup-like separator 106 is arranged in the hollow space. The separator separates the electrodes 103 and 105 from one another. The separator 106 is a sleeve composed of a non-woven material of plastic fibers, for example, polypropylene.

The upper edge 111 of the separator is folded over radially inward so that the separator 106 encapsulates the negative electrode 105 on all sides.

The pin-like current collector 107 makes contact with the negative electrode 105 arranged within the hollow space 104. The pin-like current collector has a first, terminal section 107b completely recessed in the negative electrode 105, and a second section 107c not in direct contact with the negative electrode 105. Furthermore, the current collector 107 has the conically tapering tip 107a and the head 107d.

The cover plate 102 has a central aperture through which the current collector 107 is guided out of the housing interior to the outside. The current collector 107 and the cover plate 102 are welded to one another in at least one of the positions 109 and 110 by a continuous annular welding seam. The central aperture is hermetically sealed in this way so that electrolyte is prevented from escaping in this region.

Electrolyte located in the interior space of the housing comprising the housing parts 101 and 102 could come into direct contact with the current collector 107 in the region of the second section 107c. However, this is effectively prevented by the insulator element 108a. The insulator element 108a is a tailored sleeve composed of plastic and fitted onto the current collector 107. The sleeve covers the current collector 107 starting from the central aperture as far as the point at which it enters the negative electrode 105.

The sleeve 108a is a subsection of the integrally formed plastic part 108 further comprising the annular section 108b. The annular section 108b is fitted onto the edge 112 of the cover plate. The annular section 108b is the sealing element insulating the cover plate 102 and the housing cup 101 from one another. Overall, the plastic part 108 fulfils both the function of the insulator element for the current collector 107 and the electrically insulating sealing element for the cover plate 102 and the housing cup 101.

The plastic part 108 can be formed, in particular, by an injection-molding process.

The housing casing 101b of the cylindrical housing cup 101 has a circumferential lug 101d formed by radial drawing-in and faces the interior space, beneath the circular opening edge 101c. The lug serves as a positioner for the cover plate 102. The edge 102a of the cover plate 102 then sits, together with the sealing element 108b that is fitted on it, on the lug 101d.

The circular opening edge 101c of the housing cup 101 is bent radially inward over the edge 102a of the cover plate 102 so that the diameter of the opening defined by the opening edge is smaller than the diameter of the cover plate 102. The cover plate 102 sitting on the lug 101d is then pushed, together with the sealing element 108b that is fitted on it, onto the lug 101d by the radially inwardly bent opening edge 101c and fixed.

Although my cell and method have been described in connection with specific forms thereof, it will be appreciated that a wide variety of equivalents may be substituted for the specified elements described herein without departing from the spirit and scope of this disclosure as described in the appended claims.

The invention claimed is:

1. A lithium cell comprising:
   a positive electrode in the form of a hollow cylinder and defining a hollow space,
   a negative electrode arranged in the hollow space,
   a separator arranged between the positive and negative electrodes,
   a liquid electrolyte with which the electrodes and the separator are impregnated,
   a housing surrounding an interior space in which the positive and negative electrodes and the separator are arranged,
   a pin-shaped current collector for the negative electrode having a first, terminal section completely recessed in the negative electrode and a second section, immediately adjacent to the first, terminal section, that is not in direct contact with the negative electrode, and
   an insulator element protecting the second section, at least in regions, from direct contact with the electrolyte, wherein
   the housing comprises a cylindrical housing cup, a cover plate and an electrically insulating, annular sealing element,
   the housing cup has an end-side cup base, a circumferential housing casing and an end-side, circular opening is situated opposite the housing base and is formed by a circular opening edge,
   the cover plate is circular, has a circumferential edge and closes the circular opening,
   the sealing element is fitted onto the edge of the cover plate and insulates the cover plate and the housing cup from one another, and
   the pin-shaped current collector electrically connects to the cover plate.

2. The cell according to claim 1, wherein at least one of:
   the pin-shaped current collector is welded to the cover plate,
   the cover plate has an aperture through which the pin-shaped current collector is guided, and
   the cover plate and the pin-shaped current collector connect to one another by an annular welding line guided around the current collector.

3. The cell according to claim 1, wherein at least one of:
   the housing casing of the cylindrical housing cup has a circumferential lug formed by radial drawing-in and faces the interior space,
   the edge of the cover plate is seated, together with the annular sealing element, on the lug, and
   the circular opening edge of the housing cup is placed radially inward over the edge of the cover plate so that the diameter of the opening defined by the opening edge is smaller than the diameter of the cover plate.

4. The cell according to claim 1, having at least one of:
   the separator is a closed container completely surrounding the negative electrode and having only one aperture for the first current collector, and
   the separator connects to the insulator element by welding or adhesive bonding.

5. The cell according to claim 1, wherein
   the function of the insulator element and the electrically insulating sealing element are an integral plastic part.

* * * * *